Figure 1:
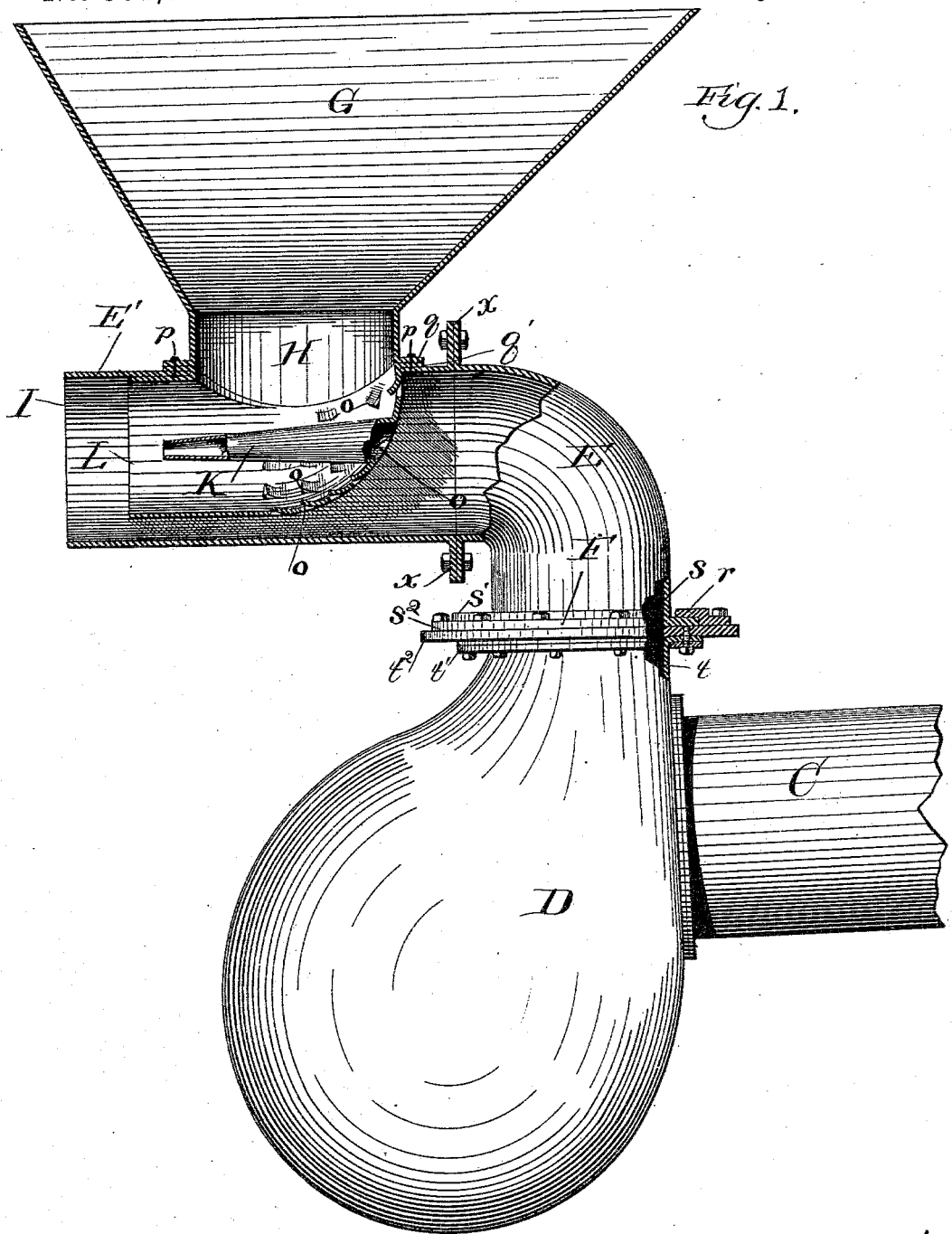

(No Model.) 2 Sheets—Sheet 1.

W. H. NEWTON.
PROCESS OF AND DEVICE FOR VENTILATING AND TRIMMING GRAIN.

No. 301,513. Patented July 8, 1884.

Witnesses:
Chas. E. Gaylord.
Douglas Dyrenforth.

Inventor:
William H. Newton,
by Dyrenforth & Dyrenforth,
Attorneys.

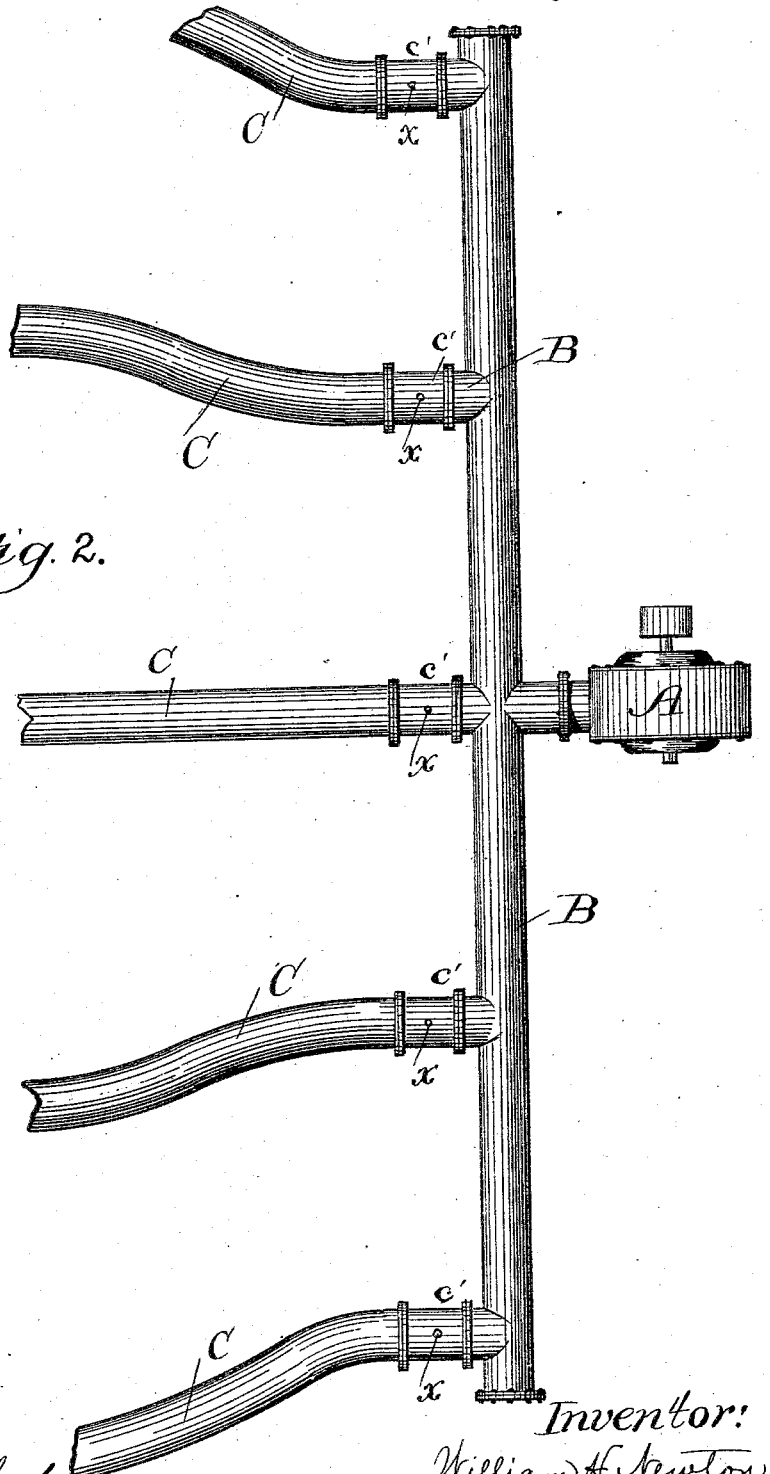

UNITED STATES PATENT OFFICE.

WILLIAM H. NEWTON, OF CHICAGO, ILLINOIS.

PROCESS OF AND DEVICE FOR VENTILATING AND TRIMMING GRAIN.

SPECIFICATION forming part of Letters Patent No. 301,513, dated July 8, 1884.

Application filed December 31, 1883. (No model.)

*To all whom it may concern:*

Be it known that I, WILLIAM H. NEWTON, a citizen of the United States, residing at Chicago, in the county of Cook and State of Illinois, have invented a new and Improved Process of Ventilating and Trimming Grain; and I hereby declare the following to be a full, clear, and exact description of the same.

Stored grain requires periodically to be handled to relieve it from moisture or heat by ventilation. The method most commonly resorted to in the past to effect this purpose has been to discharge the grain from above into bins situated in the lower part of elevators, and again to elevate it to the storage-compartment, and allow air to mix with it during the operation. Opportunity for ventilating grain is also afforded in the operation of trimming, when it is discharged from the elevator into the hold of a vessel through the hatchway, accumulating in a heap immediately beneath the opening, whence it is distributed by hand-labor to fill all parts of the hold. This is called "trimming the grain," and involves scattering and removal of the same from the heap into which it is deposited, during which operation it is cooled and dried, or "ventilated" by contact of the air with it.

The object of my invention is to provide a process whereby grain may readily be ventilated in elevators in which it is stored, and whereby it may be trimmed, and at the same time ventilated by the operation of trimming, when transferred from one part of an elevator to another, or from an elevator to a receptacle for transportation.

To this end my invention consists in introducing air under pressure into the conduit through which the grain is discharged, behind the grain, and in the direction of its discharge, and causing a portion of the compressed-air current to expand immediately beyond the inlet of the grain to draw it down and prevent choking of the inlet; and my invention further consists in the particular mechanism for carrying my process into effect which I prefer to employ, and which is represented in the drawings, of which—

Figure 1 is a side elevation of a portion of my device, partially in section, to show details of construction; and Fig. 2, a similar view of a blower connected with a tube having branches with tubes connected to them, each tube being adjustable to a device represented in Fig. 1.

The device represented in the drawings is adapted for use especially in transferring grain from an elevator to the holds of vessels, and it is this connection to which the description which follows is principally confined.

A, Fig. 2, is a blower suitably connected with a transverse tube, B, preferably of flexible material—such as canvas, rubber, or the like. The tube B is provided with branch tubes $c'$, having suitable shut-off valves, $x$, and C C are tubes, likewise formed preferably of flexible material, and provided with means for being detachably connected with the branch tubes $x$, to afford connections between the tubes B and the device shown in Fig. 1 of the drawings, of which one may be provided for each hatchway of a vessel. The valves $x$ are provided to serve the purpose of confining the supply of air to the desired number of tubes C, and through the latter to the number of devices connected therewith, and to be operated simultaneously.

D is a bag of flexible material, forming a reservoir for the air, which enters the same through a tube, C, suitably connected with it. The bag D is connected with the elbow E, to which the spout E' is attached, as shown at $x'$, by means of a flanged joint, F, comprising a flanged ring, $t$, secured around the edge of the opening in the top of the bag, flanged ring $t'$, surrounding the ring $t$, an annular plate, $t^2$, resting upon and bolted to the ring $t'$, a flanged ring, $s$, secured to the lower edge of the elbow E, an annular plate, $s'$, surrounding the ring $s$, an annular plate, $s^2$, resting upon and bolted to the plate $t^2$, and a Z-shaped annular plate, $r$, bolted to the plate $t^2$ and extending over the ring $s$ to form an air-tight joint, the whole construction being such as to permit a revolving movement of the elbow E and spout E', and mechanism connected therewith above the reservoir.

G is a hopper provided with a neck, H, and I an elbow provided with a flange, $q$, to correspond with a similar flange formed upon the neck of the hopper, whereby the neck H and elbow I may be secured together and to the spout E' by means of bolt-fastenings p. The elbow I is of less diameter than the spout E' in order that when the horizontal portion of the former is caused to lie against the inside upper surface of the spout, as shown, the space between the spout and elbow will be of the form of a crescent.

K is a tapering nozzle connected at the rear inner end of the elbow I to the latter over one of a series of apertures, o, formed therein. If desired, more than one nozzle K may be employed to cover apertures o.

To explain the operation of my mechanism it will only be necessary to describe one tube C, leading from the tube B to the device shown in Fig. 1 of the drawings, and it need only be stated that as many tubes C may be attached and conections made as devices are required, the number being limited only by the capacity of the blower. The hopper G may have a suitable frame-work formed around it, by means of which the device shown in Fig. 1 of the drawings may be readily removed from place to place, the frame-work then serving as a carriage for the same, and which may be detachably secured, preferably by means of clamps, to the combing of the hatchway to support the hopper and mechanism below the same, and permit the latter, including the end of the tube C, which bends over the combing of the hatchway, to enter and lie within the hole. Power being applied to the blower A, air is forced into a tube, C, by way of the tube B, and thence into the reservoir D, whence it passes through the elbow E into the rear end of the spout E'. The elbow I offers a partial obstruction to the passage of the air, some of which passes through the apertures o and nozzle K, the remainder being compressed, owing to the obstruction and escaping through the crescentic opening around the elbow. A spout from an elevator led into a hopper, G, discharges grain into the same, which is drawn down by the suction produced by the expansion of the air which leaves the narrow end of the nozzle K, and of that which enters the enlarged space L by way of the crescentic opening between the elbow I and inner side of the spout E', and is then thrown the desired distance by the force of the air-current, and in any direction by revolving the spout E'. The small end of the nozzle K necessarily projects beyond the edge of the hopper-neck directly above it, since, were the nozzle to terminate short of the diameter of the neck, or with the same, the air on leaving it, which is compressed within the nozzle, owing to its tapering form, would expand in an upward as well as in other directions, and would have the effect of impeding the downward progress of the grain, whereas its expansion near the outlet of the elbow, together with the expansion in the opening L of the spout I of the larger volume of air which enters through the crescentic opening, produces an indraft, whereby the grain is drawn down with great force.

The hopper above described is not an absolutely essential feature of the device, since it could be omitted, when the discharge-spout from the elevator could be conducted directly into the opening to the elbow I. Under some circumstances this might be the preferred way, since thereby the velocity of the falling grain could be utilized to throw it as far or farther with a diminished volume of the air-current. The reservoir or bag D may also be dispensed with, and a tube, C, connected directly to the rear end of the tube E', the only object of the bag being to produce evenness in the current of air, which would occasionally be spasmodic and pulsatory if the blower were at all imperfect and the current were made to strike directly from the blower against the grain-conducting parts. Actual experiment demonstrated the fact that about thirteen hundred cubic feet of air discharged under a pressure of one-fifth of a pound to the square inch was sufficient to throw a quantity of grain weighing about seven hundred pounds a distance of forty-eight feet in one minute. If the distances from bulk-head to bulk-head in the hold are less than or exceed that distance, the blower can be gaged accordingly, or blowers having different capacities may be used, if desired. The grain, with the device used in my experiment, owing to the suction-power generated in the spout I and elbow E, passes down very rapidly, the force having been sufficient to rend a cotton cloth spread over the opening in the hopper, and it is estimated that a quantity of grain would pass through the hopper in the same time that a quantity of air equal in bulk would pass. A variable pressure obtainable by a variation in the area of the crescentic opening between the elbow I and inner side of the tube E' is advisable for grains differing from each other in the weight of a given bulk, since the lighter grains—such as flax-seed, oats, and the like—will be thrown a greater distance with a given force than will the heavier—such as wheat—with the same force. The cooling and drying of the grain which enters the elbow I, which should be of a diameter equal to or less than that of the hopper-neck, is due to its passage through the air and the mixture of the air with it. Corn thrown forty-eight feet in less than a second of time was so dry or reaching the ground that mere pressure with the foot reduced it to flour.

I am aware that it is not new to ventilate and trim grain by the action of compressed air, various mechanisms having hitherto been patented for utilizing compressed air for this purpose.

What I claim as new, and desire to secure by Letters Patent, is—

1. The process of ventilating and trimming grain, which consists in drawing falling grain through a suitable inlet into the discharge-pipe by the expansion immediately beyond the inlet of the grain of a portion of a current of compressed air, the said compressed-air current operating to force the grain through the outlet, substantially as described.

2. In a device for ventilating and trimming grain, the combination of the following elements, viz: a blower, A, discharge-tube E', connected by suitable mechanism with the blower, elbow I, of smaller dimensions than the tube E', and secured to the said tube to leave a passage extending part way around it, and provided with openings o, one or more tapering nozzles, K, secured at their larger ends to the rear inner end of the elbow I, over one or more openings, o, in the latter, and inlet H, the whole being constructed and arranged to operate substantially as described.

3. In a device for ventilating and trimming grain, the combination of the following elements, viz: a blower, A, tube B, connected with the said blower and provided with branches c', having suitable valves, x, reservoir D, one or more tubes, C, each suitably connected with a branch, x, and with a reservoir, D, elbow E, connected at one end with and capable of revolving upon the reservoir D by means of a flange-joint, F, spout E', provided with an inlet, H, and secured to the other end of the elbow E, elbow I, of smaller dimensions than the spout E' and secured to lie against the inner and upper side of the same, and provided with openings o, and nozzle K, secured over an opening, o, to the inner rear surface of the elbow I, the whole being constructed and arranged to operate substantially as described.

WILLIAM H. NEWTON.

In presence of—
DOUGLAS DYRENFORTH,
L. R. PUFFER.